Sept. 10, 1935.   J. F. LEVENTHAL   2,013,661
MOTION PICTURE APPARATUS
Filed Feb. 7, 1931    2 Sheets-Sheet 1
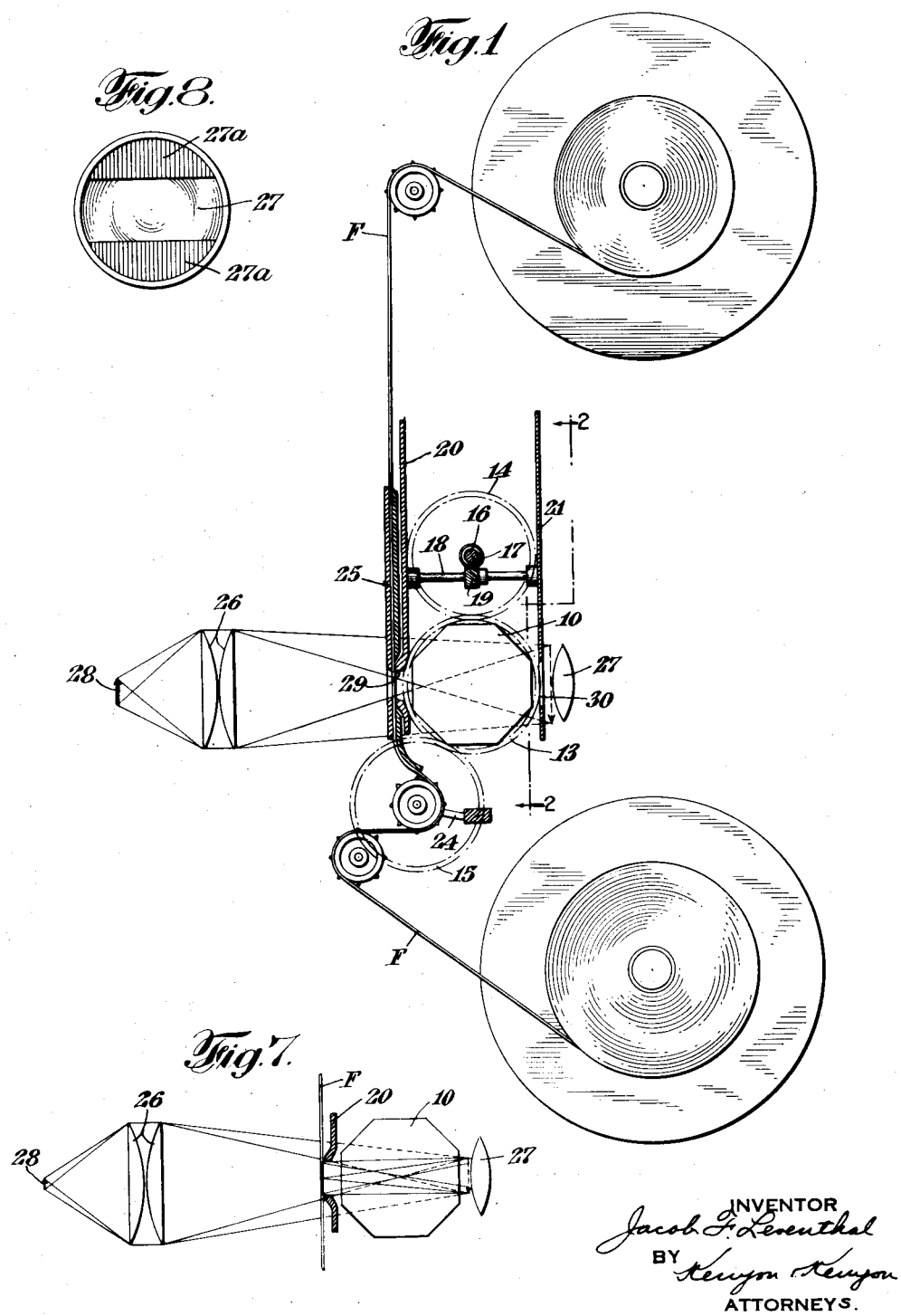

Sept. 10, 1935.   J. F. LEVENTHAL   2,013,661
MOTION PICTURE APPARATUS
Filed Feb. 7, 1931   2 Sheets-Sheet 2
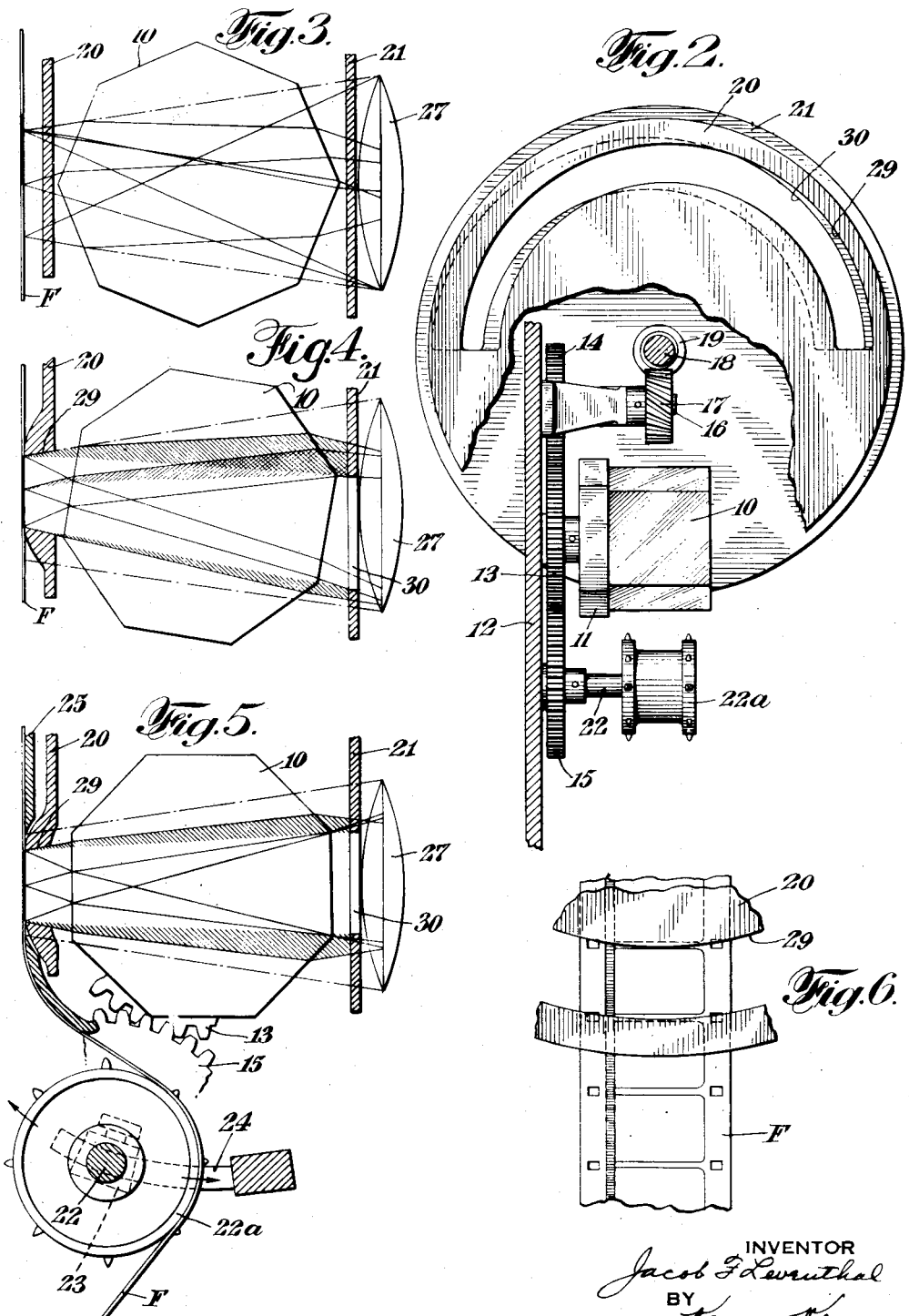
INVENTOR
Jacob F Leventhal
BY
Kenyon & Kenyon
ATTORNEY Patented Sept. 10, 1935

2,013,661

UNITED STATES PATENT OFFICE 2,013,661

MOTION PICTURE APPARATUS

Jacob F. Leventhal, New York, N. Y., assignor to Leventhal Patents, Inc., New York, N. Y., a corporation of Delaware Application February 7, 1931, Serial No. 514,142

2 Claims. (Cl. 88—16.8)

This invention relates to motion picture projectors and more especially to projectors of the non-intermittent type.

One form of non-intermittent projector contains a rotatable optical compensator which compensates the continuous movement of the film to produce stationary images of successive pictures. Such a compensator may comprise a polygonal refractor having an equal number of plane-parallel surfaces equally distant from the axis of rotation and constituting a plurality of plane-parallel refracting units which are brought successively into operative position by rotation of the compensator. The rotational axis of the compensator intersects at right angles the optical axis of the lens system of the projector and the film is drawn across said optical axis at uniform linear speed by rotatable feeding mechanism operated in timed relation with the compensator so that each picture is compensated by a refracting unit to produce a stationary image. An objectionable feature of such an optical compensator is the production of undesirable aberrations during the opening and closing periods of compensation of a picture.

An object of this invention is to eliminate the undesirable aberrations produced by an optical compensator during the opening and closing periods of picture compensation. According to the present invention, the objectionable aberrations are eliminated by interrupting the light path through the apparatus during the periods of compensation productive of such aberrations and provision also is made for confining to a single refracting unit the light path through the projector, thereby eliminating undesirable effects in connection with the formation of the images. Preferably, the light path is interrupted by means of a rotating screen having a spiral slot equal in width to height of picture, thereby preventing projection of more than one picture and also preventing light from entering the refractor through more than one face.

Other objects, novel features and advantages of this invention will be apparent from the following specification and accompanying drawings, wherein:

Fig. 1 is a vertical partially diagrammatic section through an apparatus embodying the invention;

Fig. 2 is a section on the line 2—2 of Fig. 1, partially broken away;

Figs. 3 to 5 inclusive are fragmentary sections generally similar to Fig. 1;

Fig. 6 is a fragmentary view through the slot in the film screen;

Fig. 7 is a diagrammatic view of a modification, and

Fig. 8 is a detail of an alternate means of restricting the light path.

In an apparatus embodying the invention, an optical compensator 10 comprising a polygonal or multiple unit refractor (a transparent body having an even number of plane faces parallel to and equally distant from an axis of rotation) is mounted on a carrier 11 rotatably supported by the frame 12. A pinion 13 associated with the carrier meshes with pinions 14 and 15. The pinion 14 is fixed to a stub shaft 16 rotatably supported by the frame 12 and a worm wheel 17 is fixed to said shaft. A shaft 18 is provided with a worm gear 19 which meshes with the wheel 17 and is also provided with a pair of screens 20 and 21 arranged on opposite sides of the refractor. The pinion 15 is mounted on a shaft 22 rotatably supported by a carrier 23 slidably mounted on a curved guide 24 concentric with the pinion 13. The compensator 10 is in effect a plurality of refracting units having plane-parallel faces and a common central portion, the units being brought successively into operative position by rotation of the compensator.

On the shaft 22 is mounted a film sprocket 22a by means of which the film F is drawn through the gate 25 located adjacent the screen 20. The projector is provided with a lens system comprising a condenser lens 26 and a projection lens 27, the optical axis of the system being arranged to intersect at right angles the axis of rotation of the refractor 10. A suitable source 28 is provided for supplying light to the condenser lens. The screens 20 and 21 are provided with curved slots 29 and 30 which in certain positions of the screens permit light to pass through the refractor 10 to the lens 27.

The relation of the film sprocket 22a to the compensator is such that when an edge of the compensator 10 registers with the optical axis of the lens system, the lower edge of a picture film also registers with the optical axis. The shaft 18 constitutes the drive for the apparatus and is rotated by any suitable means. The ratio of the gears is such that for each complete revolution of the shaft the film is advanced a distance equal to one picture and the refractor is rotated to bring the next edge of the refractor into register with the optical axis. Each refractor unit is thus successively brought into proper relation to the film to compensate a picture.

The characteristics of a polygonal compensator are such that objectionable aberrations are produced during opening and closing periods of compensation. Therefore, the arrangement of the slot 29 is such that light is permitted to pass to the refractor only during the period during which the compensator is not productive of the objectionable aberrations. Preferably, the slot is of proper width and spiral shape that it permits passage of light to the refractor only through a single picture. The surfaces of the refractor are of greater width than the height of a picture and therefore the light which passes through the slot 29 enters only one refracting unit. The slot 30 is of proper width and spiral shape that it permits passage to the projection lens 27 only of light emanating from the operating refracting unit. By this arrangement, objectionable light effects are avoided and a sharp clear image of the picture is produced.

In the absence of film in the projector, the illuminated portion of the screen has a curved bottom edge and a curved upper edge, the position of which varies slightly with rotation of the screens due to the spiral curvature of the slots 29 and 30. To avoid this effect during picture projection, the pictures may be separated by opaque bands of sufficient width (see Fig. 6) so that the slot edges do not project into the picture field at any time, thereby avoiding the undesirable effect above referred to.

Instead of using the screen 21 for preventing light passing to the lens from the faces of inoperative refracting units, the lens 27 may be coated with opaque material 27a adjacent its periphery (see Fig. 8) to such extent that the transmitting portion of the lens is small enough to permit passage only of light emanating from a single surface of the refractor. Also, the light path through the apparatus may be limited to a single refracting unit by making use of a light source sufficiently restricted in the direction of film feed that the light which forms the image of the source traverses but a single refracting unit. (See Fig. 7.)

It is of course understood that various modifications may be made in the structure of the device above described without in any way departing from the spirit of the invention as defined in the appended claims.

I claim:

1. In a motion picture projection apparatus, a rotatable multiple unit compensator comprising a refractor having a plurality of pairs of plane-parallel faces, means for supplying a beam of light to said compensator, means to move a film across said beam and to rotate said refractor through a compensating cycle in timed relation with movement of the film through a picture cycle to produce a stationary virtual image of the film picture, a lens for re-imaging said virtual image, a pair of screens arranged front and rear of said refractor, means for rotating said screens in timed relation with said refractor, said front screen having a spiral slot arranged to permit passage of light except during the initial and final portions of a compensating cycle and said rear screen having a spiral slot arranged to limit to a single pair of plane parallel faces light rays passing to said lens.

2. In a motion picture projection apparatus, a rotatable multiple unit compensator comprising a refractor having a plurality of pairs of plane-parallel faces, means for supplying a beam of light to said compensator, means to move a film across said beam and to rotate said refractor through a compensating cycle in timed relation with movement of the film through a picture cycle to produce a stationary virtual image of the film picture, a lens for re-imaging said virtual image, a rotating screen arranged between the film and the refractor, means for rotating said screen in timed relation with said refractor, said screen having a spiral slot equal in width to the height of a film picture and arranged to permit passage of light except during the initial and final portions of each compensating cycle and means for limiting to a single pair of plane parallel faces light rays passing to said lens.

JACOB F. LEVENTHAL.